(12) United States Patent
Pawlowski

(10) Patent No.: US 8,281,395 B2
(45) Date of Patent: Oct. 2, 2012

(54) PATTERN-RECOGNITION PROCESSOR WITH MATCHING-DATA REPORTING MODULE

(75) Inventor: J. Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 802 days.

(21) Appl. No.: 12/350,132

(22) Filed: Jan. 7, 2009

(65) Prior Publication Data

US 2010/0175130 A1    Jul. 8, 2010

(51) Int. Cl.
*H04L 29/06* (2006.01)
*G06F 11/00* (2006.01)
*G06F 15/173* (2006.01)
*G06F 7/02* (2006.01)
*G06F 13/40* (2006.01)

(52) U.S. Cl. .......... 726/22; 713/150; 714/57; 709/224
(58) Field of Classification Search .......... 726/22; 714/57; 713/201; 709/224
See application file for complete search history.

(56) References Cited

U.S. PATENT DOCUMENTS

| | | | |
|---|---|---|---|
| 4,739,398 A * | 4/1988 | Thomas et al. ................ | 725/22 |
| 5,300,830 A | 4/1994 | Hawes | |
| 5,331,227 A | 7/1994 | Hawes | |
| 5,974,485 A | 10/1999 | Kruschinski | |
| 6,240,003 B1 | 5/2001 | McElroy | |
| 6,880,087 B1 | 4/2005 | Carter | |
| 6,906,938 B2 | 6/2005 | Kaginele | |
| 6,944,710 B2 | 9/2005 | Regev et al. | |
| 7,089,352 B2 | 8/2006 | Regev et al. | |
| 7,146,643 B2 | 12/2006 | Dapp et al. | |
| 7,392,229 B2 | 6/2008 | Harris et al. | |
| 7,854,008 B1 * | 12/2010 | Huang et al. ................... | 726/24 |
| 2003/0200464 A1 * | 10/2003 | Kidron .......................... | 713/201 |
| 2005/0219887 A1 | 10/2005 | Hsu et al. | |
| 2007/0075878 A1 | 4/2007 | Furodet et al. | |
| 2007/0127482 A1 | 6/2007 | Harris et al. | |
| 2007/0282833 A1 | 12/2007 | McMillen et al. | |
| 2009/0044273 A1 * | 2/2009 | Zhou et al. ..................... | 726/24 |

(Continued)

FOREIGN PATENT DOCUMENTS

EP    0380294    8/1990

(Continued)

OTHER PUBLICATIONS

Zoican, S.; "Digital signal processing system for image pattern recognition"; Telecommunications in Modern Satellite, Cable and Broadcasting Service, 2001. TELSIKS 2001. 5th International Conference on vol. 2; Digital Object Identifier: 10.1109/TELSKS.2001. 955811; Publication Year: Jan. 2001 , pp. 423-425.*

(Continued)

*Primary Examiner* — Eleni Shiferaw
*Assistant Examiner* — Courtney Fields
(74) *Attorney, Agent, or Firm* — Fletcher Yoder

(57) ABSTRACT

Disclosed are methods and devices, among which is a device that includes a pattern-recognition processor. The pattern-recognition processor may include a matching-data reporting module, which may have a buffer and a match event table. The buffer may be coupled to a data stream and configured to store at least part of the data stream, and the match event table may be configured to store data indicative of a buffer location corresponding with a start of a search criterion being satisfied.

38 Claims, 17 Drawing Sheets

U.S. PATENT DOCUMENTS

2010/0115347 A1* 5/2010 Noyes .................. 714/57

FOREIGN PATENT DOCUMENTS

WO   WO 03090426 A1 * 10/2003

OTHER PUBLICATIONS

Beesley, K. R.; Arabic Morphology Using Only Finite-State Operations; Xerox Research Centre Europe; pp. 50-57.

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the $12^{th}$ Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

Noyes, et al., U.S. Appl. No. 12/253,966, filed Oct. 18, 2008, "System and Method of Indirect Register Access".

Noyes, et al., U.S. Appl. No. 12/253,967, filed Oct. 18, 2008, "Indirect Register Access Method and System".

Noyes, U.S. Appl. No. 12/265,421, filed Nov. 5, 2008, "Methods and Systems to Accomplish Variable Width Data Input".

Noyes, et al., U.S. Appl. No. 12/265,436, filed Nov. 5, 2008, "Bus Translator".

Noyes, U.S. Appl. No. 12/265,465, filed Nov. 5, 2008, "Pattern-Recognition Processor with Results Buffer".

Noyes, et al., U.S. Appl. No. 12/268,270, filed Nov. 10, 2008, "Methods and Systems for Directly Connecting Devices to Microcontrollers".

Noyes, U.S. Appl. No. 12/325,875, filed Dec. 1, 2008, "Systems and Methods for Managing Endian Mode of a Device".

Noyes, U.S. Appl. No. 12/325,982, filed Dec. 1, 2008, "Systems and Methods to Enable Identification of Different Data Sets".

Noyes, U.S. Appl. No. 12/325,986, filed Dec. 1, 2008, "Devices, Systems, and Methods to Synchronize Simultaneous DMA Parallel Processing of a Single Data Stream by Multiple Devices".

Noyes, U.S. Appl. No. 12/325,990, filed Dec. 1, 2008, "Devices, Systems, and Methods to Synchronize Parallel Processing of a Single Data Stream".

Noyes, U.S. Appl. No. 12/347,403, filed Dec. 31, 2008, "Systems, Methods, and Devices for Configuring a Device".

Pawlowski, U.S. Appl. No. 12/350,136, filed Jan. 7, 2009, "Buses for Pattern-Recognition Processors".

Pawlowski, U.S. Appl. No. 12/350,142, filed Jan. 7, 2009, "Methods and Systems for Power Consumption Management of a Pattern-Recognition Processor".

Noyes, U.S. Appl. No. 12/352,311, filed Jan. 12, 2009, "Devices, Systems, and Methods for Communicating Pattern Matching Results of a Parallel Pattern Search Engine".

Harris, U.S. Appl. No. 60/652,738, filed Feb. 12, 2005, "Means and Mechanism for Finding Meaningful Information in Databases or Data Sets by Topical Content Patterns at Speeds Exceeding Conventional Computers".

Hurson A. R.; A VLSI Design for the Parallel Finite State Automaton and Its Performance Evaluation as a Hardware Scanner; International Journal of Computer and Information Sciences, vol. 13, No. 6. 1984.

* cited by examiner

PATTERN-RECOGNITION PROCESSOR WITH MATCHING-DATA REPORTING MODULE

BACKGROUND

1. Field of Invention

Embodiments of the invention relate generally to electronic devices and, more specifically, in certain embodiments, to electronic devices with pattern-recognition processors.

2. Description of Related Art

In the field of computing, pattern recognition tasks are increasingly challenging. Ever larger volumes of data are transmitted between computers, and the number of patterns that users wish to identify is increasing. For example, spam and malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

When a pattern is detected, it is often useful to examine the data that matched the pattern. Reproducing the matching data, however, may be difficult. Searches may specify wildcard characters or other operators that allow arbitrarily long portions of the data stream to produce a match. Further, portions of different patterns may be matched by the same portions of the data stream, while the different patterns may start and stop at different times. Creating a new copy of the data stream each time the data stream begins to match one of the patterns is expensive, as forming multiple, arbitrarily long copies of the data stream consumes a large amount of memory.

DETAILED DESCRIPTION

Figure 1:
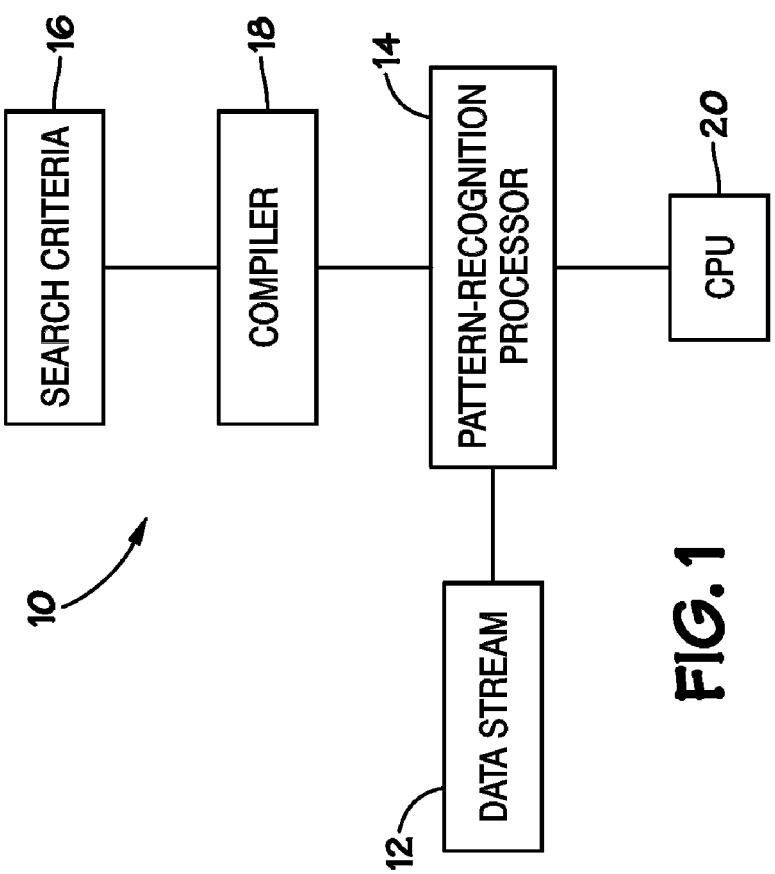
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria 16 may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Alternatively, the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria 16 to the system 10. The search criteria 16 may be periodically updated from the server as different types of malware emerge. The search criteria 16 may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be a hardware device that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
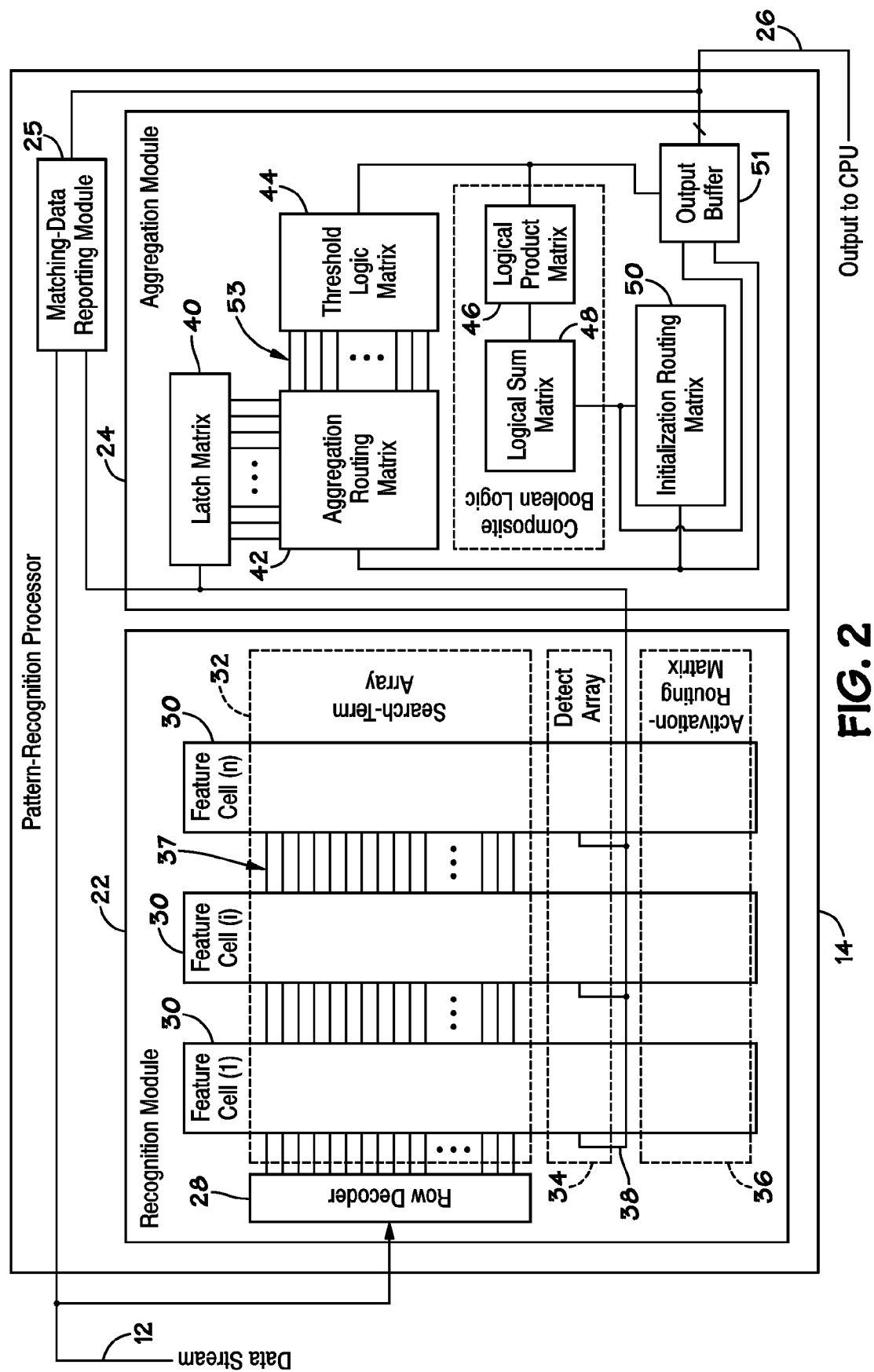
FIG. 2 depicts an example of a pattern-recognition processor in the system of FIG. 1.

FIG. 2 depicts an example of the pattern-recognition processor 14. The pattern-recognition processor 14 may include a recognition module 22, an aggregation module 24, and a matching-data reporting module 25. The recognition module 22 may be configured to compare received terms to search terms, and both the recognition module 22 and the aggregation module 24 may cooperate to determine whether matching a term with a search term satisfies a search criterion. The matching-data reporting module 25 may store the data stream 12 in a buffer and report matching data to the CPU 20 (FIG. 1).

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 may be transmitted to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
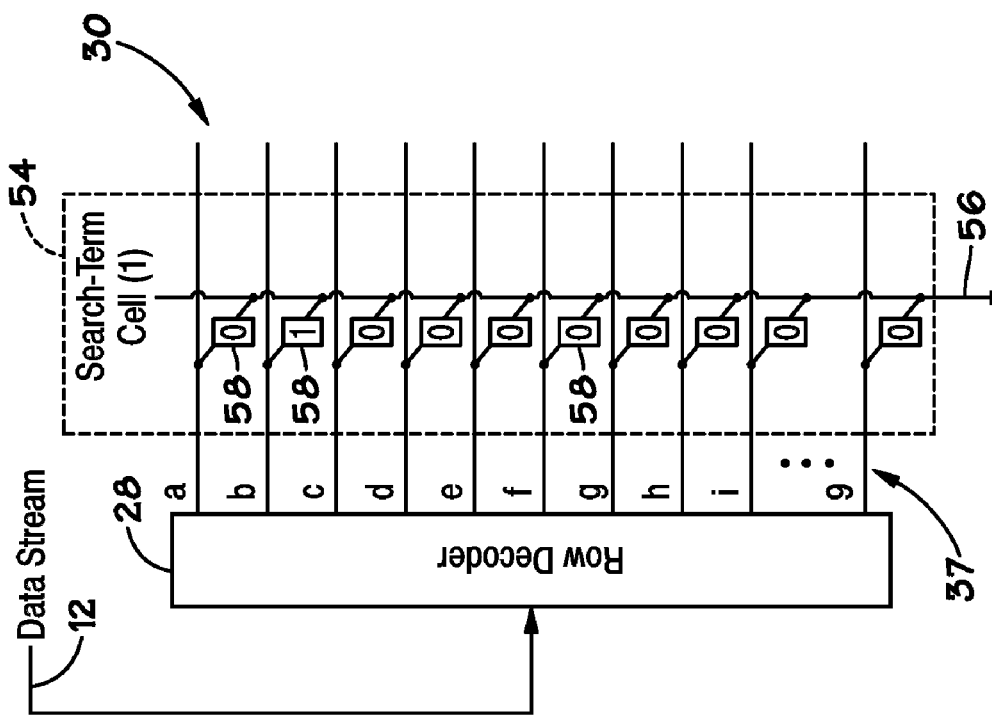
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of non-volatile memory. The memory cells 58 may also include memory cells made out of logic gates, e.g., flip-flops.

Figure 5:
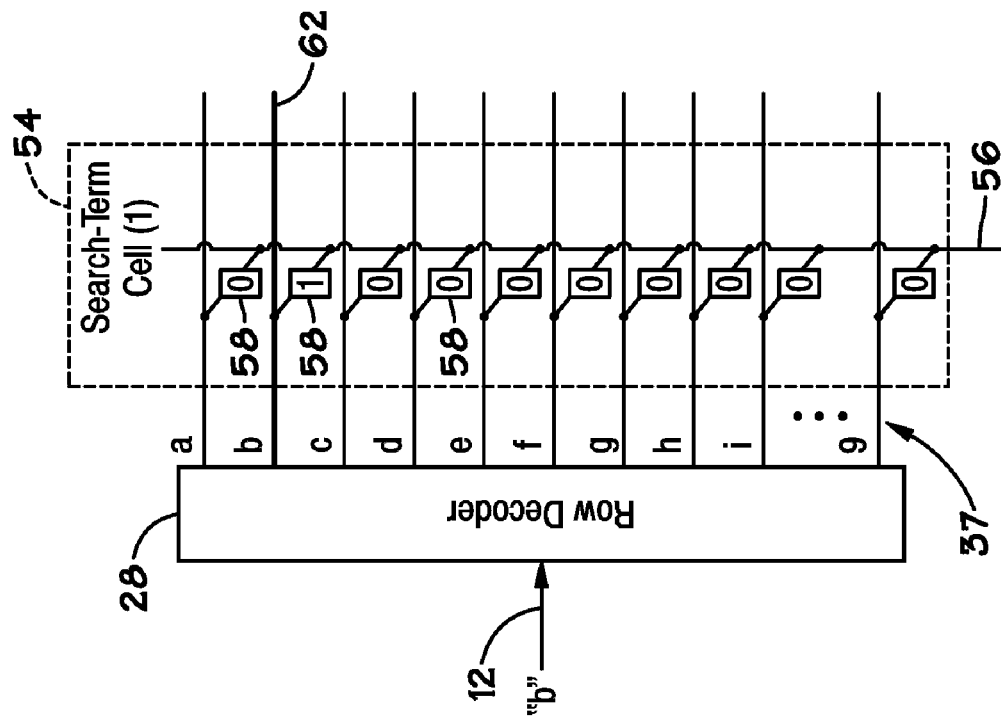
FIGS. 4 and 5 depict the search-term cell of FIG. 3 searching the data stream for a single character.
Figure 4:
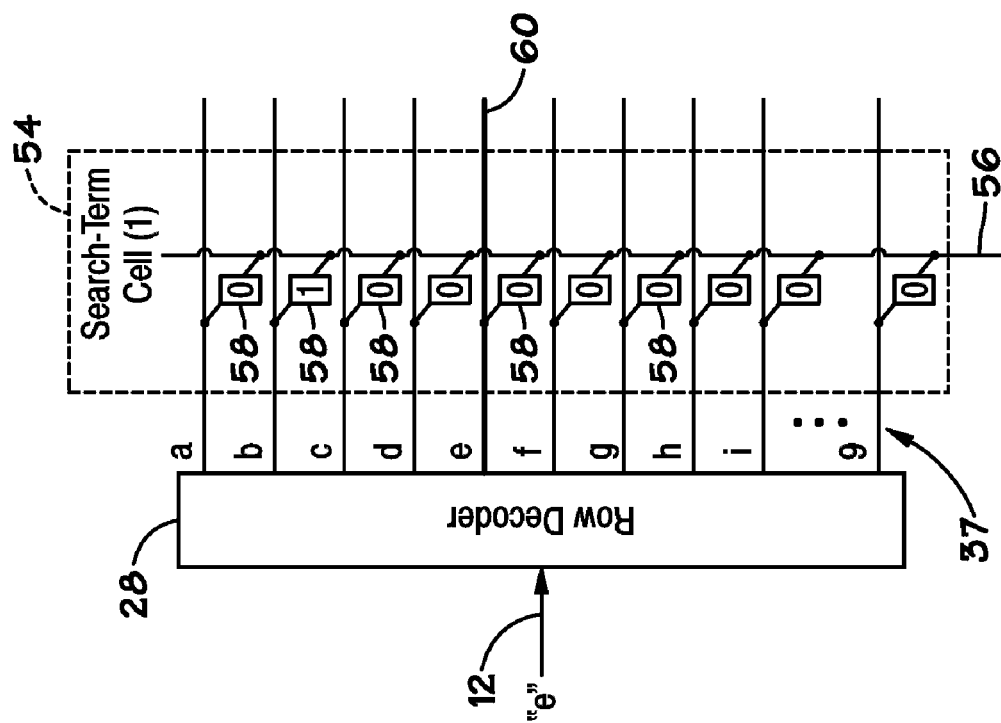

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
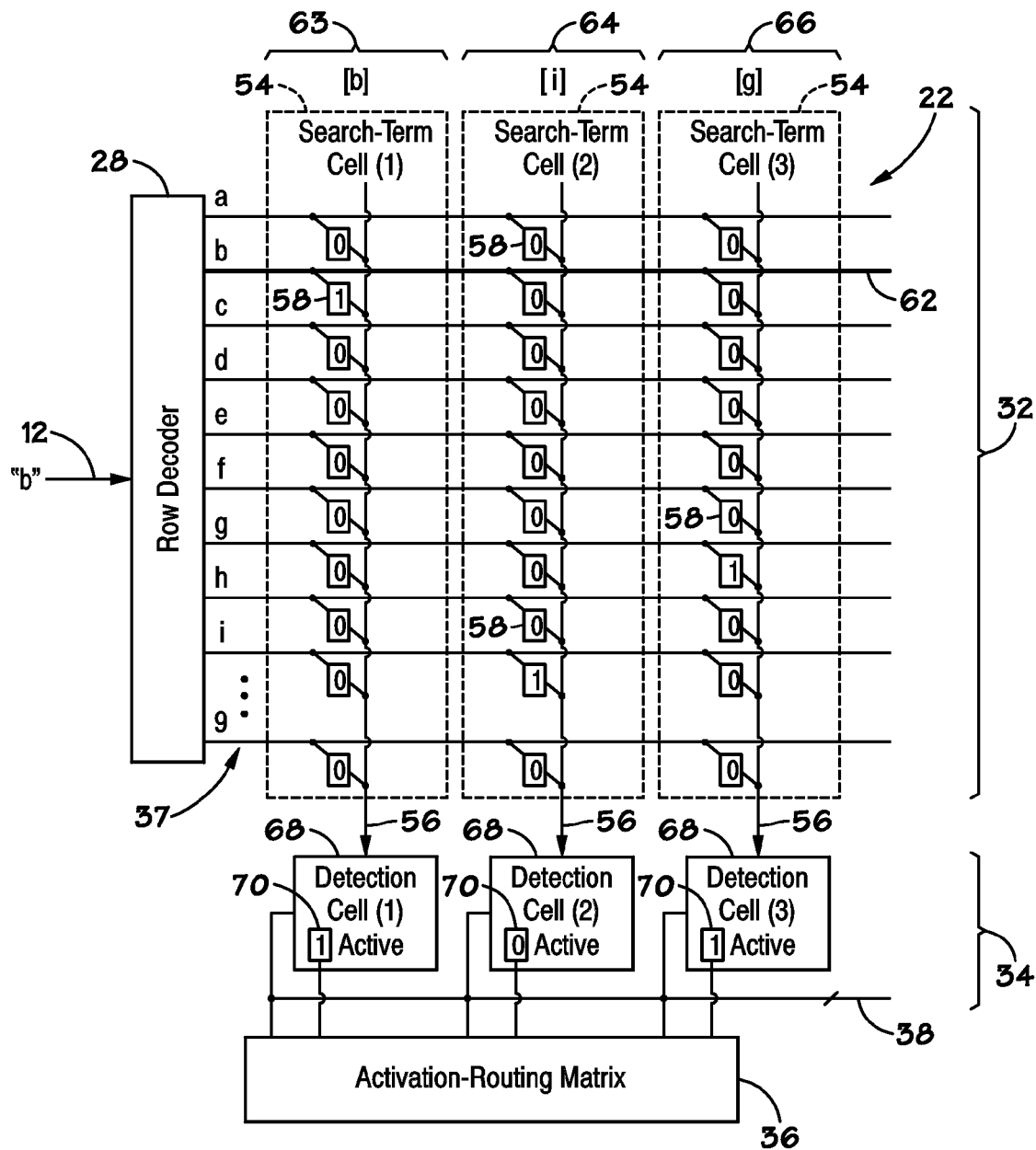
FIGS. 6-8 depict a recognition module including several search-term cells searching the data stream for a word.
Figure 7:
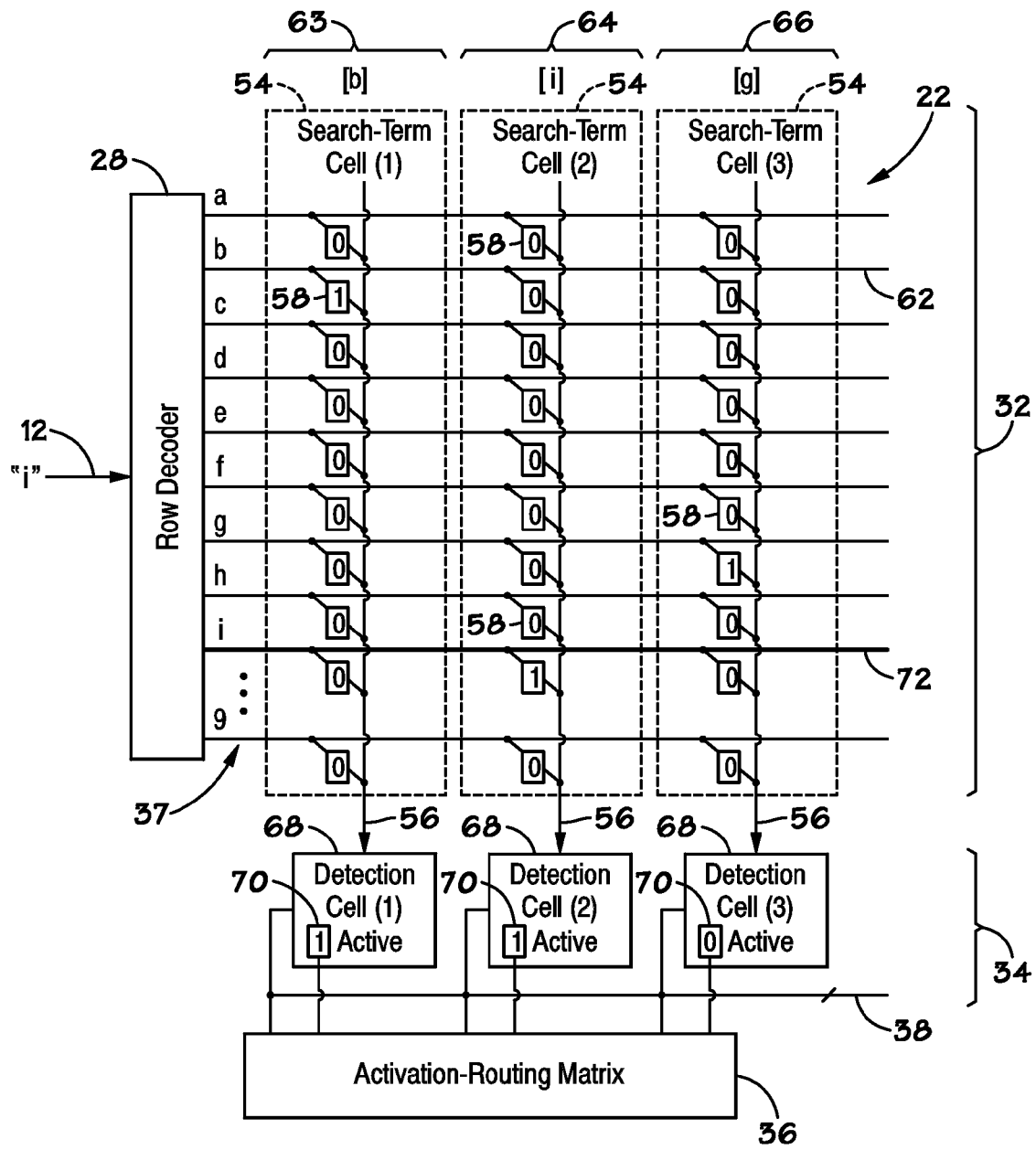
Figure 8:
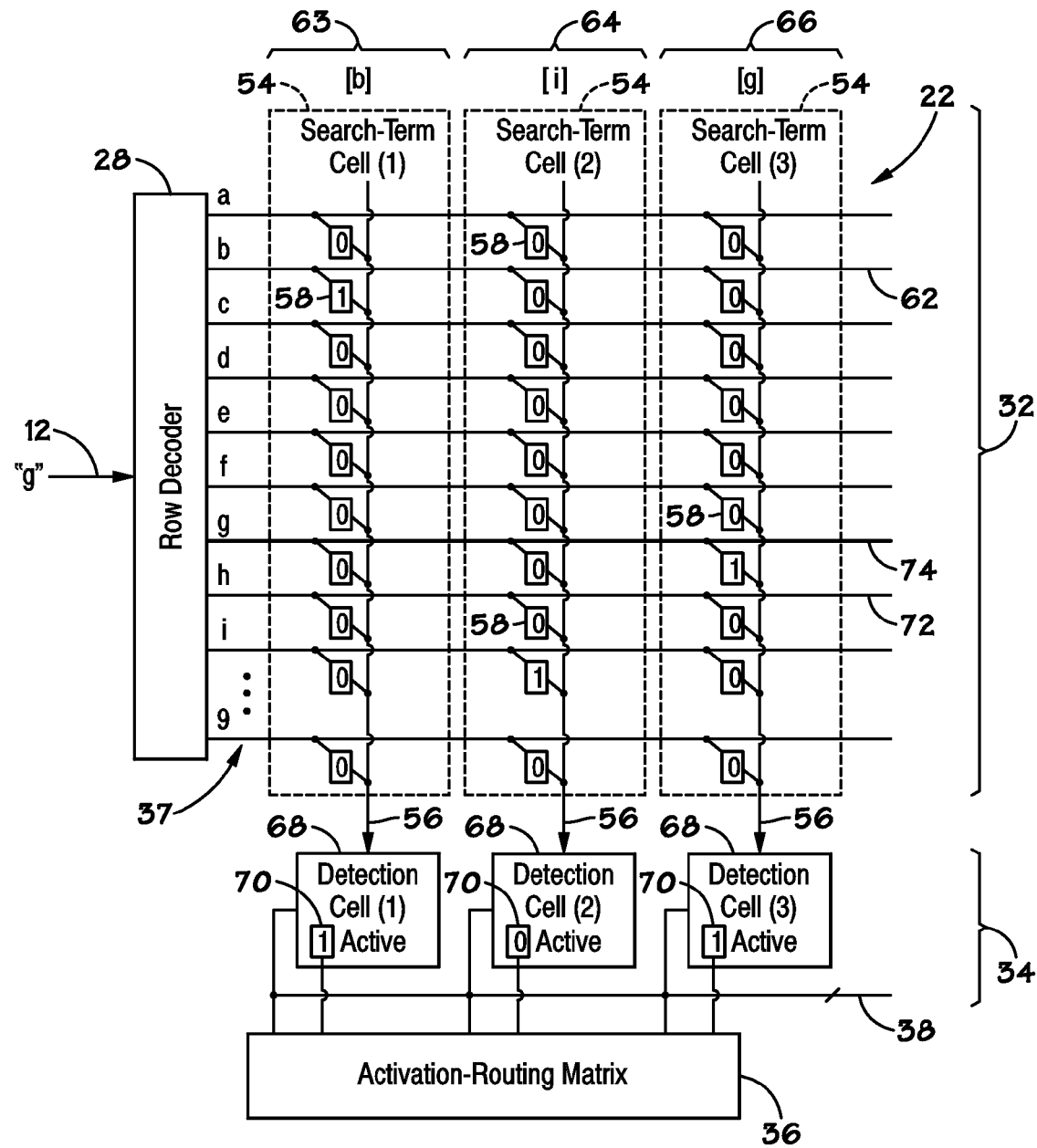

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive feature cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example. The feature cell 63 may remain active in case the data stream 12 presents the first term of the search criterion again.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
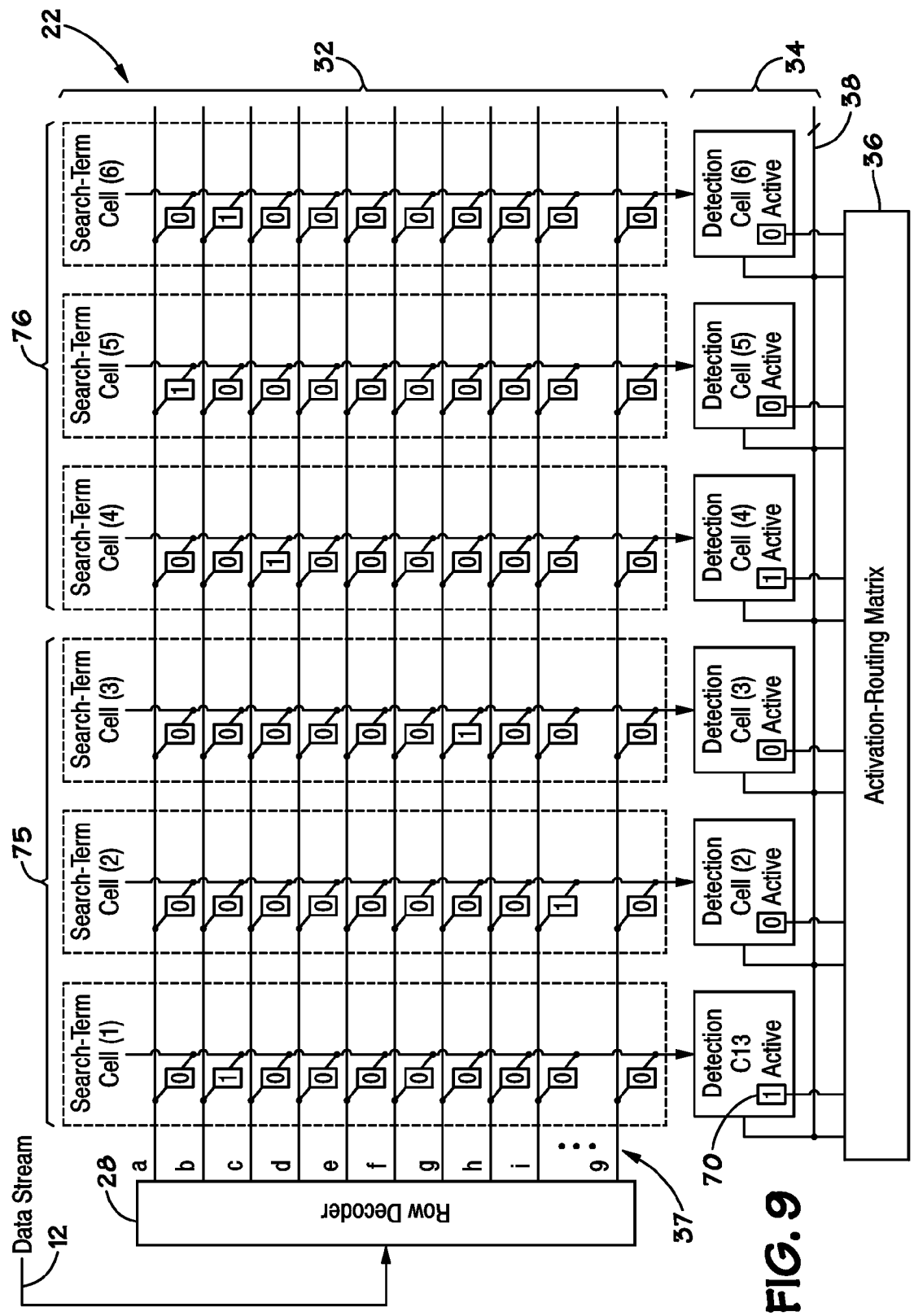
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
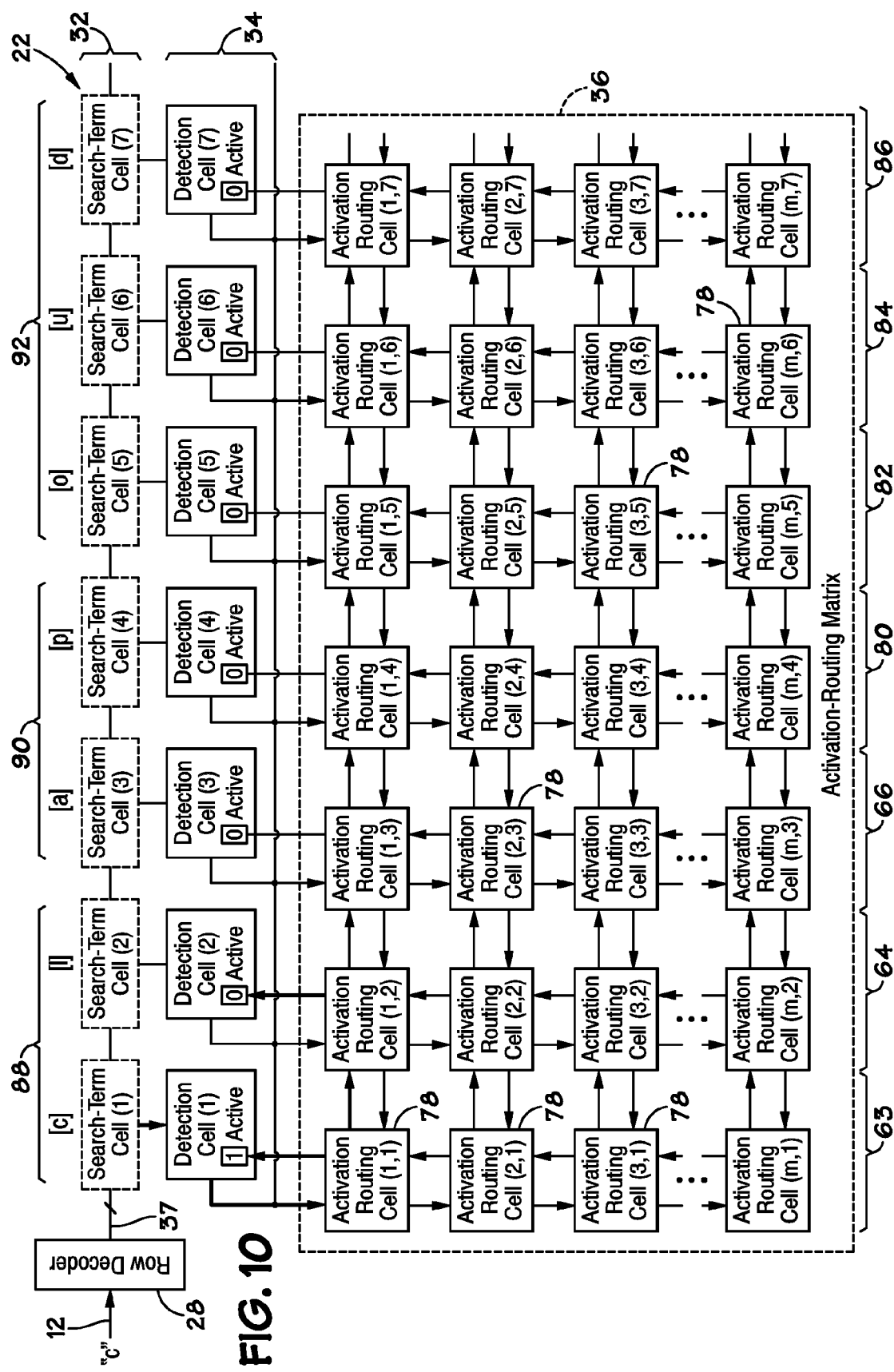
FIGS. 10-12 depict the recognition module searching according to a search criterion that specifies multiple words with the same prefix.
Figure 11:
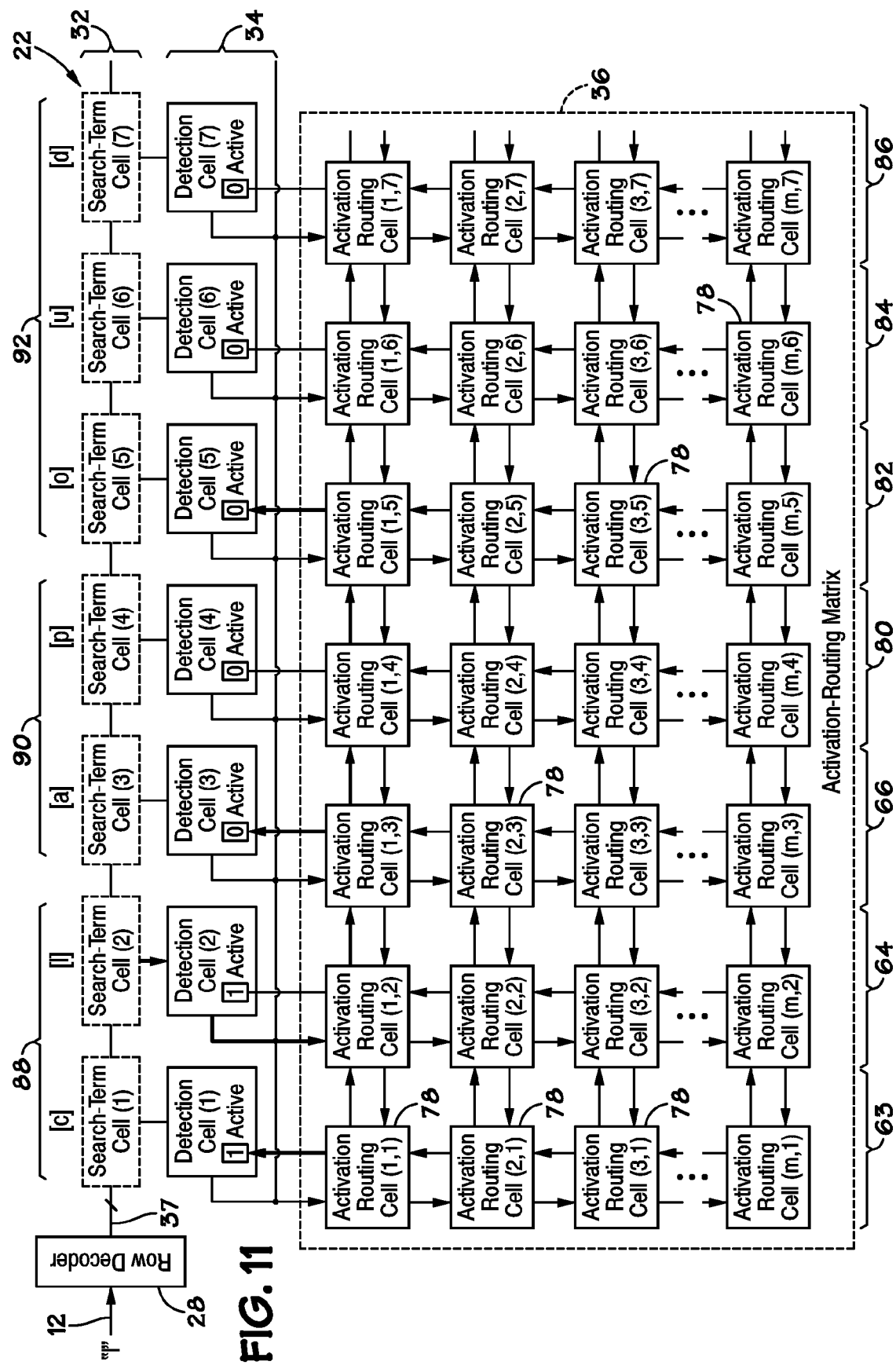
Figure 12:
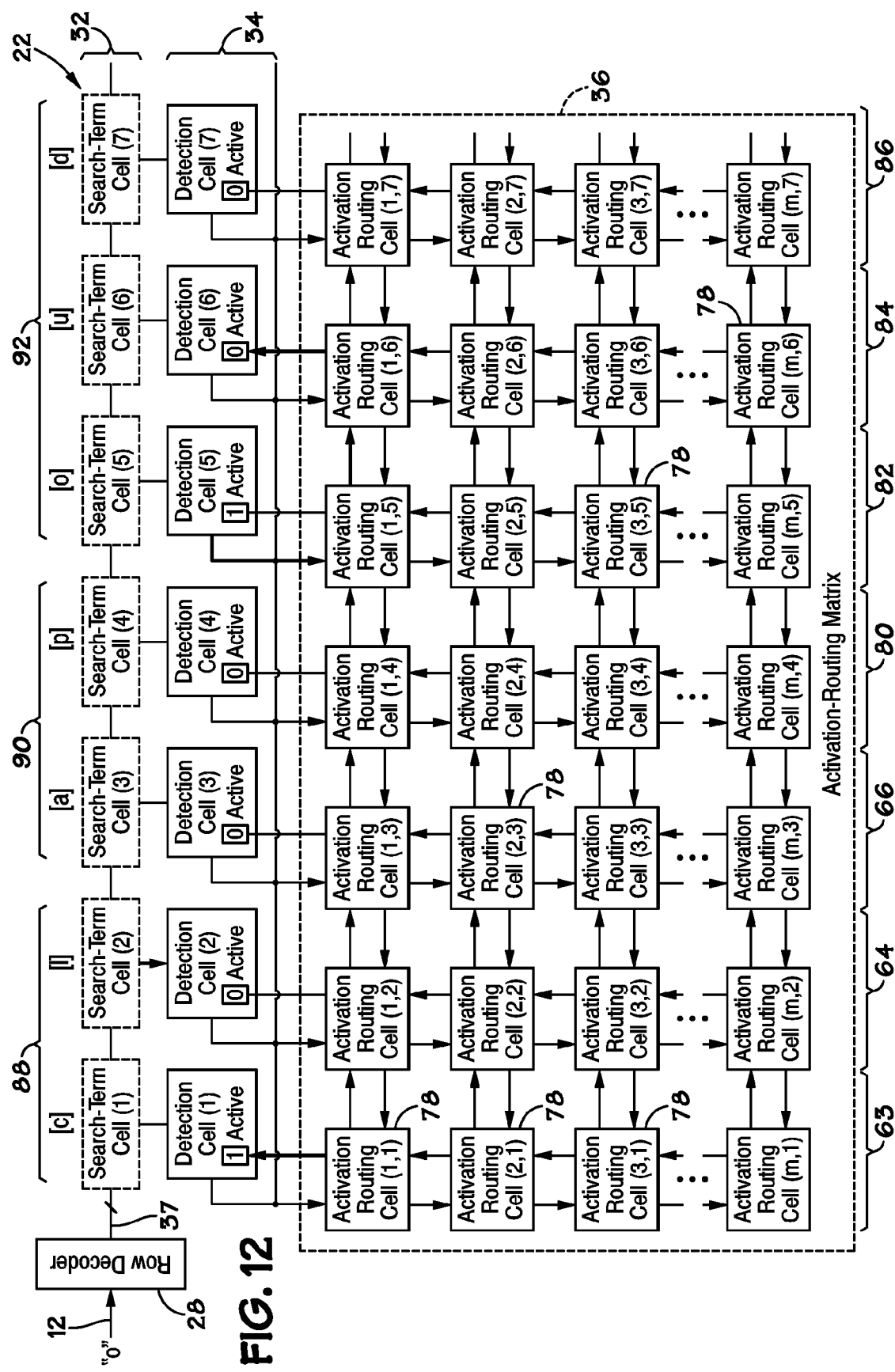

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to more complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
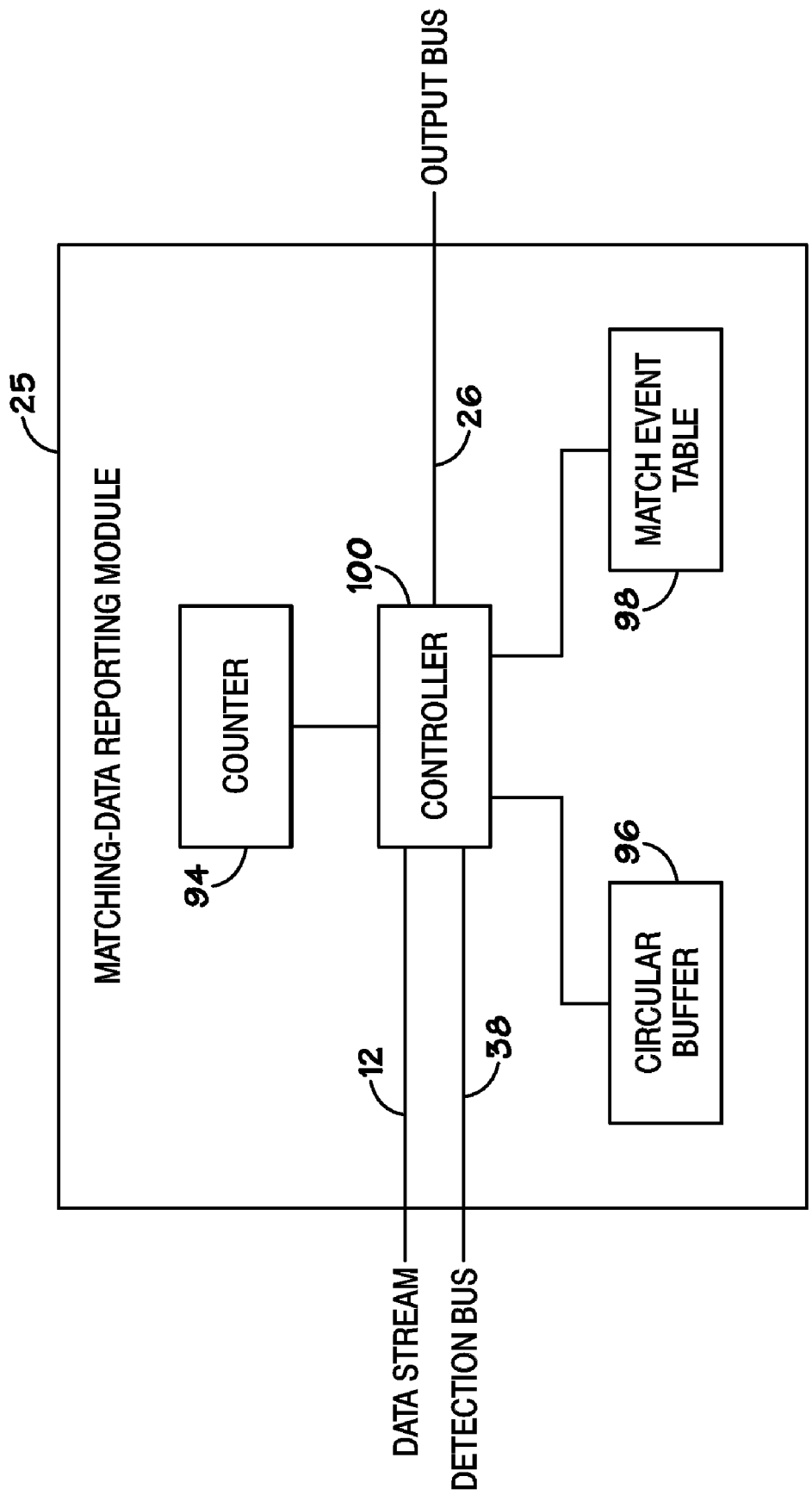
FIG. 13 illustrates an embodiment of a matching-data reporting module in accordance with an embodiment of the present technique.

FIG. 13 illustrates an embodiment of the matching-data reporting module 25. The matching-data reporting module 25 may include a counter 94, a circular buffer 96, a match event table 98, and a controller 100. The controller 100 may connect to the counter 94, the circular buffer 96, and the match event table 98. The controller 100 may also connect to the data stream 12, the detection bus 38, and the output bus 26.

The counter 94 may increment or decrement a count each time the data stream 12 presents a term, e.g., once per search cycle, or once per clock cycle, which is not to suggest that a search cycle cannot have the same duration as a clock cycle. The counter 94 may be a synchronous counter having bits that change state at about the same time, or it may be an asynchronous counter. The counter 94 may be a free-running counter that is typically not stopped during normal operation, or it may be a counter that can be stopped and reset, e.g., with a command from the controller 100. The counter 94 may be a modulo-n counter that repeats after every n terms from the data stream 12. In other embodiments, the counter 94 may be a pattern generator that outputs a repeatable sequence of values, e.g., a linear feedback shift register. The counter 94 may also be a clock that outputs a timestamp periodically or upon request. The counter 94 may be configured to count up to a certain number before repeating, e.g., by resetting. The number of increments before the counter 94 resets may be about equal to the number of terms stored by the circular buffer 96 or the number of bits stored by the circular buffer 96. For example, the counter 94 may be a binary counter configured to count with less than 21 digits, more than 21 digits, e.g., more than about 22 digits, more than about 23 digits, or more than about 25 digits.

The circular buffer 96 may include a plurality of terms cells each configured to store one term from the data stream 12. As the data stream 12 is received, the controller 100 may write terms from the data stream 12 to the circular buffer based on the value of the counter 94. The circular buffer 96 may include about the same number of terms cells as the number of increments that the counter 94 undergoes before resetting. The value of the counter 94 may be used as an address in the circular buffer 96 when storing a term presented by the data stream 12. As a result, in some embodiments, the data stream 12 may repeatedly fill the circular buffer 96, overwriting terms stored in the terms cells in the circular buffer 96 after the counter 94 resets. In other embodiments, other types of first input-first output buffers may be used, such as a linked list. The size of the circular buffer 96 may be selected based on the largest expected or desired amount of matching data that will be reported to the CPU 20 (FIG. 1). The circular buffer 96 may be configured to store less than about 2 MB, more than about 2 MB, more than about 4 MB, more than about 8 MB, more than about 16 MB, or more than about 32 MB.

The match event table 98 may store the value of the counter 94 each time the detection bus 38 signals the start of a match or the completion of a match. The match table 98 may be formed in the recognition module 22 (FIG. 2). For example, each of the feature cells 30 may include memory for storing the count at the start of a match and memory for storing the count at the end of the match. In other embodiments, the feature cells 30 may be grouped together, e.g., in groups of four or eight, and memory for the group of feature cells may store the count when one of the feature cells 30 is matched at the start of a search criterion or when one of the feature cells 30 in the group is matched at the end of the search criterion.

The match event table 98 also may be separate from the recognition module 22. Each of the feature cells 30 or groups of feature cells 30 may report a start of a criterion being satisfied or the satisfaction of the criterion to the controller 100 (FIG. 13), and the match event table 98 may store data that indicates the value of the counter 94, whether the satisfaction of the criterion is starting or is completed, and whether records of a satisfaction of a criterion that has started are safe to overwrite. The value of the counter 94 at the start or completion of a criterion being satisfied may be referred to as a "match event pointer." Each search criterion may be assigned to several addresses in the match event table 98 in case the search criterion begins to be satisfied while a previous criterion satisfaction is still in progress. Alternatively, each search criterion may be assigned an identification number that is stored in the match event table 98 along with the previously mentioned data. The match event table 98 may include a bit indicating whether the criterion satisfaction that has started is safe to overwrite, either because the criterion satisfaction has been completed and reported, or because the criterion satisfaction has been unmatched by subsequent data.

The controller 100 or other components of the pattern-recognition processor 14 (FIG. 2) may report completed criterion satisfactions to the CPU 20. In response, the CPU 20 may request a copy of the data that produced the criterion satisfaction. This request may be transmitted through the output bus 26 to the controller 100. The controller 100 may be configured to read the matched data from the circular buffer 96 based on the start and stop counts from the match event table 98 and report the matching data to the CPU 20 (FIG. 1) on the output bus 26. In other embodiments, the start count and the stop count of the criterion satisfaction may be reported to the CPU 20, and the CPU 20 may retrieve the appropriate data from the circular buffer 96.

Figure 14:
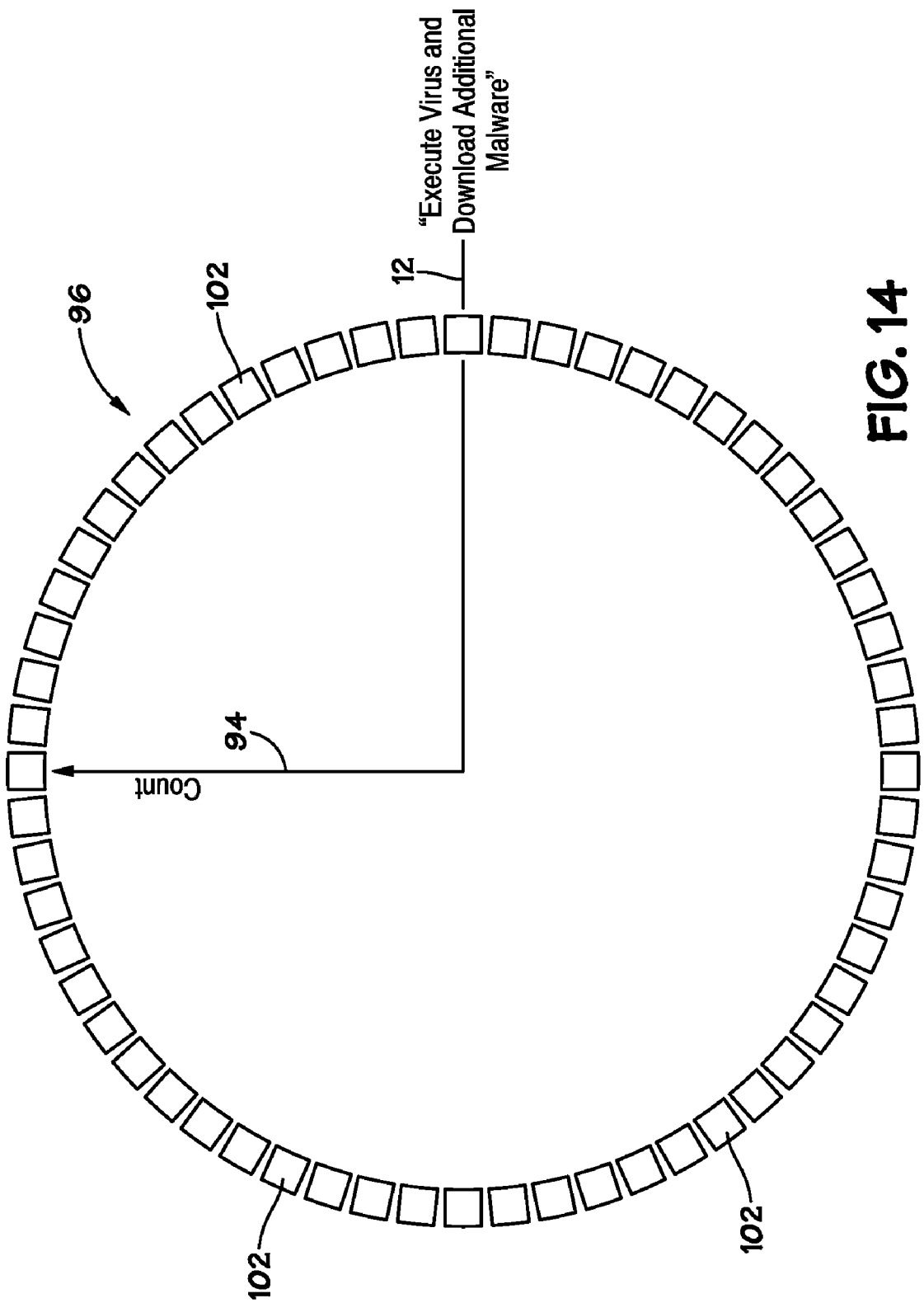
FIGS. 14-19 illustrate the matching-data reporting module of FIG. 13 operating according to an embodiment of the present technique.

The operation of the matching-data reporting module 25 is illustrated in greater detail by FIGS. 14-19. As illustrated by FIG. 14, the circular buffer 96 may be represented as a circle of terms cells 102 with the counter 94 pointing to one of the terms cells 102. The phrase "term cell" refers to a group of memory cells configured to store a single term. As the data stream 12 is received, each term may be stored in one of the terms cells 102, specifically the terms cell 102 to which the counter 94 is pointing. As each term is received from the data stream 12, the counter 94 may increment the count by one and point to the next term cell 102.

Figure 15:
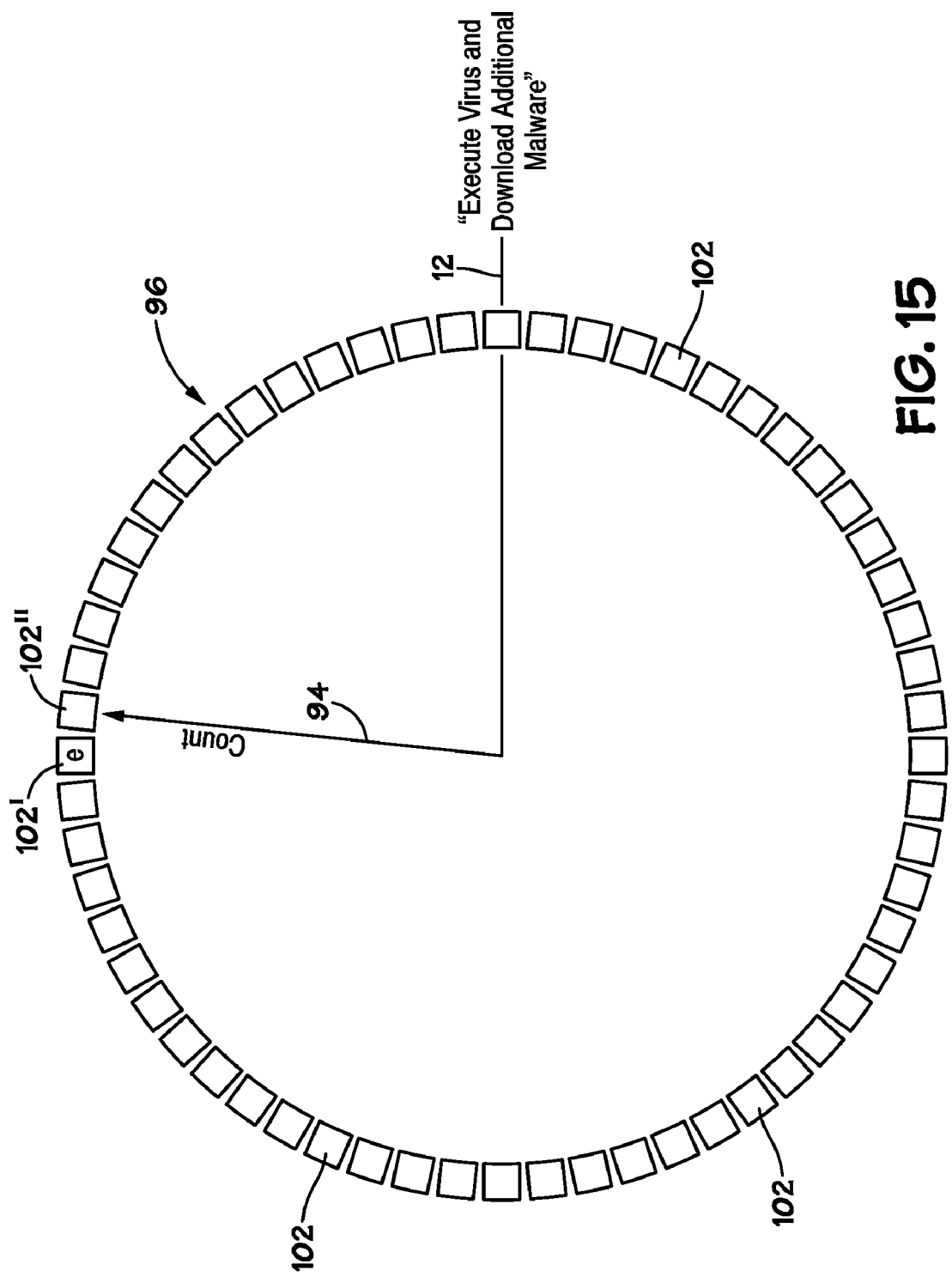

FIG. 15 illustrates the circular buffer 96 storing the first term presented by the data stream 12. The letter "e" is received from the data stream 12 and stored by the terms cell 102'. Before the next term is presented by the data stream 12, or while the next term is presented by the data stream 12, the counter 94 increments to point toward the next terms cell 102". This process may repeat with each successive term presented by the data stream 12 as the counter 94 increments to address each successive terms cell 102 in the circular buffer 96. When the counter 94 resets, the circular buffer 96 may begin to overwrite data stored in the terms cells 102.

While the circular buffer 96 is storing terms from the data stream 12, the data stream 12 may be searched. As described above, other portions of the pattern-recognition processor 14 (FIG. 2) may detect the beginning and the satisfaction of various search criteria. Matches produced by this searching may affect the operation of the matching-data reporting module 25. To illustrate this relationship, the operation of the matching-data reporting module 25 (FIG. 13) will be described with an example in which the pattern-recognition processor 14 (FIG. 2) searches the data stream 12 shown in FIG. 14-19 for two different search criteria. The first criterion, referred to in the figures as criterion A, is the word "virus" followed by the word "download" within the same sentence. Accordingly, the pattern-recognition processor 14 may search for the word "virus" and upon detecting this word, search for both the word "download" and a character that indicates the end of a sentence, such as a period. If the word "download" occurs before the character that indicates the end of a sentence, then criterion A is matched. The second search criterion, referred to in the figures as criterion B, is the word "download" occurring within four words of the word "malware". Once the word "download" is matched, the pattern-recognition processor 14 may both count the number of words, e.g., by counting inter-word characters, and search for the word "malware". Alternatively, if the word "malware" is matched first, the pattern-recognition processor 14 may both count the number of words, e.g., by counting inter-word characters, and search for the word "download". If the word "malware" occurs before four inter-word characters are presented, then criterion B is satisfied.

Figure 16:
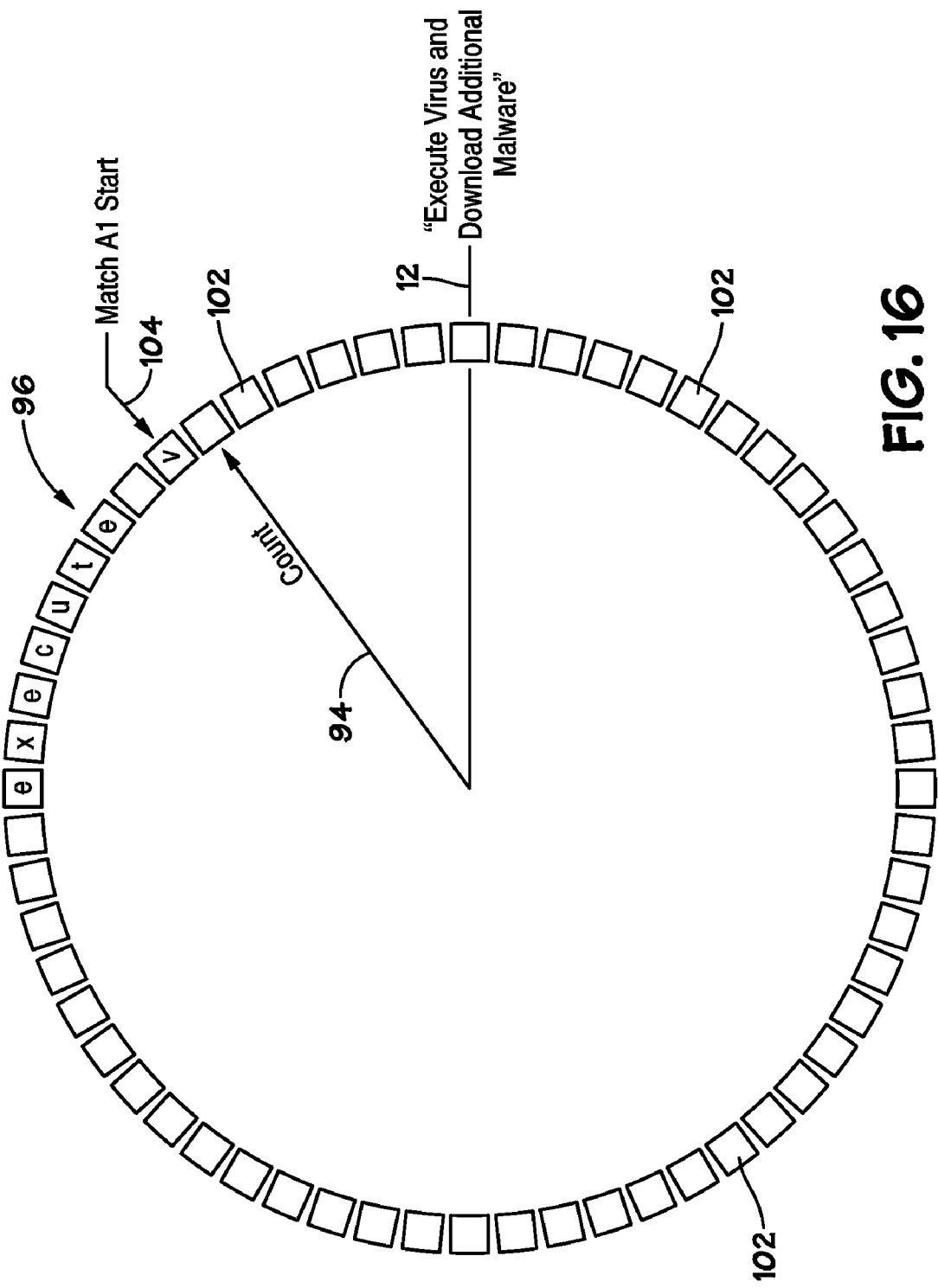

FIG. 16 illustrates the response of the matching-data reporting module 25 to the first search term in criterion A being matched: the letter "v". As the data stream 12 presents the letter "v", the first feature cell 30 (FIG. 2) of criterion A records the value of the counter 94 in the match event table 98. The first feature cell 30 may output a signal on the detection bus 38 indicating that it is active, has received a match, and is the first feature cell of search criterion A. This information may be stored in the matching-data reporting module 25 (FIG. 13) along with the value of the counter 94. The match event represented in FIG. 16 has a match event pointer 104 corresponding with the value of the count 94 at the start of the match.

Figure 17:
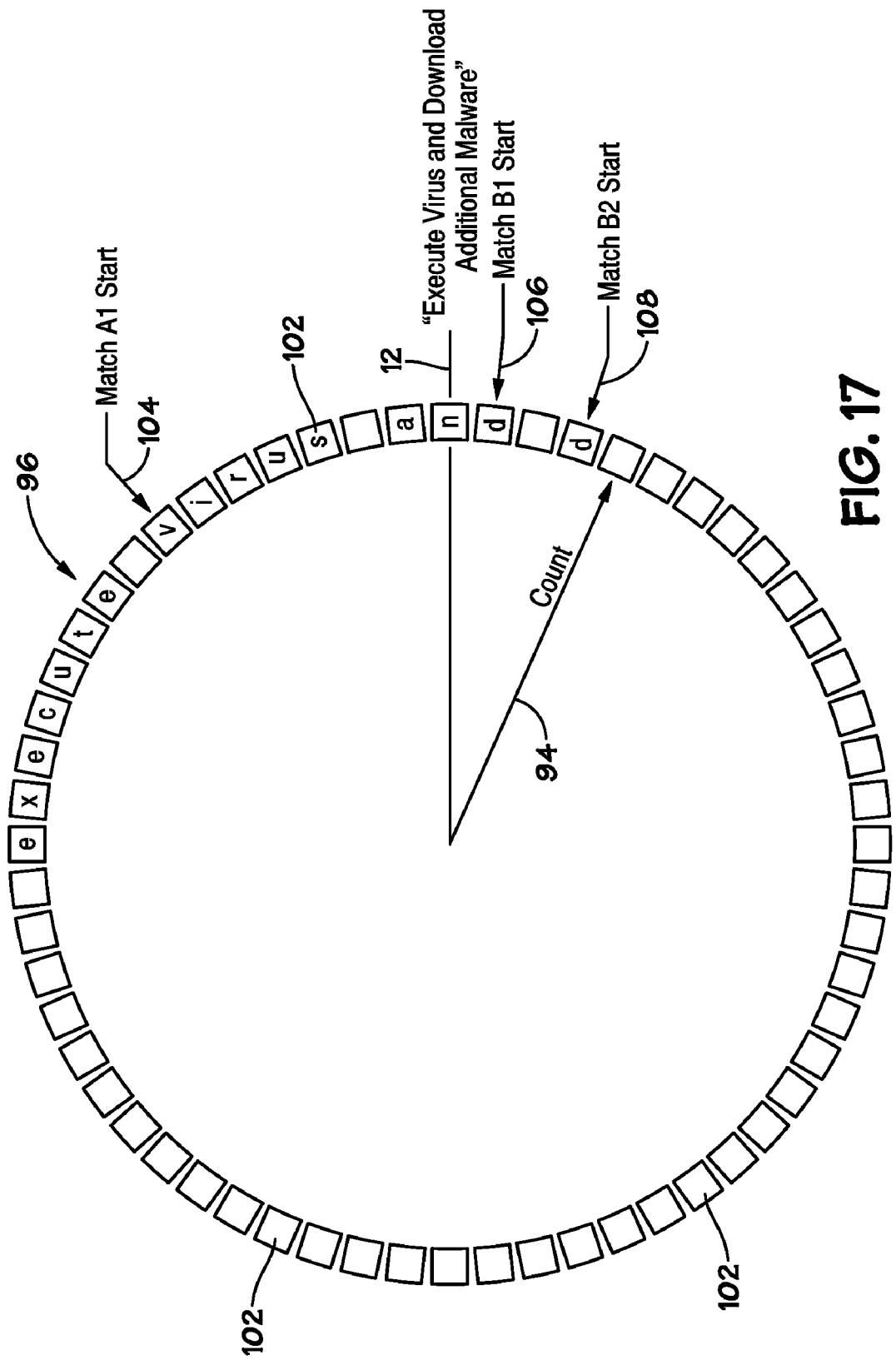

As illustrated by FIG. 17, the circular buffer 96 may continue to store terms from the data stream 12 as they are received. When the data stream 12 reaches the letter "d" in the word "and", the first feature cell 30 specifying criterion B may indicate the beginning of a match, as the letter "d" is the first letter of the word "download". In response, the match event table 98 may store the value of the counter 94, either in memory associated with the first feature cell 30 in criterion B or in separate memory. If separate memory is used, data that identifies the second criterion B may also be stored.

When the space after the word "and" is presented by the data stream 12, criterion B may be unmatched, as the second search term in criterion B searches for the letter "o", and not a space. The un-matching of criterion B may be recorded in the match event table 98 by overwriting the match event pointer 106 or designating the match event pointer 106 as being over writeable. As mentioned above, the match event table 98 may include one or more bits of memory that indicate whether a match event pointer points to a match in progress or a failed match that is safe to overwrite.

Another match event pointer 108 may be stored when the data stream 12 presents the next letter "d", at the beginning of the word "download". Again, the value of the counter 94 may be stored in the match event table 98 to form the match event pointer 108. The match event pointer 108 may overwrite the match event pointer 106, or the match event pointer 108 may be stored in different memory in the match event table 98.

At this stage in the present example, the data stream 12 has begun satisfying two different search criteria at the same time. Criterion A is searching for the rest of the word "download", and criterion B is searching for the rest of the word "download" followed by the word "malware" within the next four words. The circular buffer 96 may store a single copy of the data stream 12, and the match event table 98 may indicate which portions of this copy have satisfied or are in the process of satisfying the different criteria. The different matches of part of criterion B are distinguished by the number following the letter B, e.g., B1 and B2.

Figure 18:
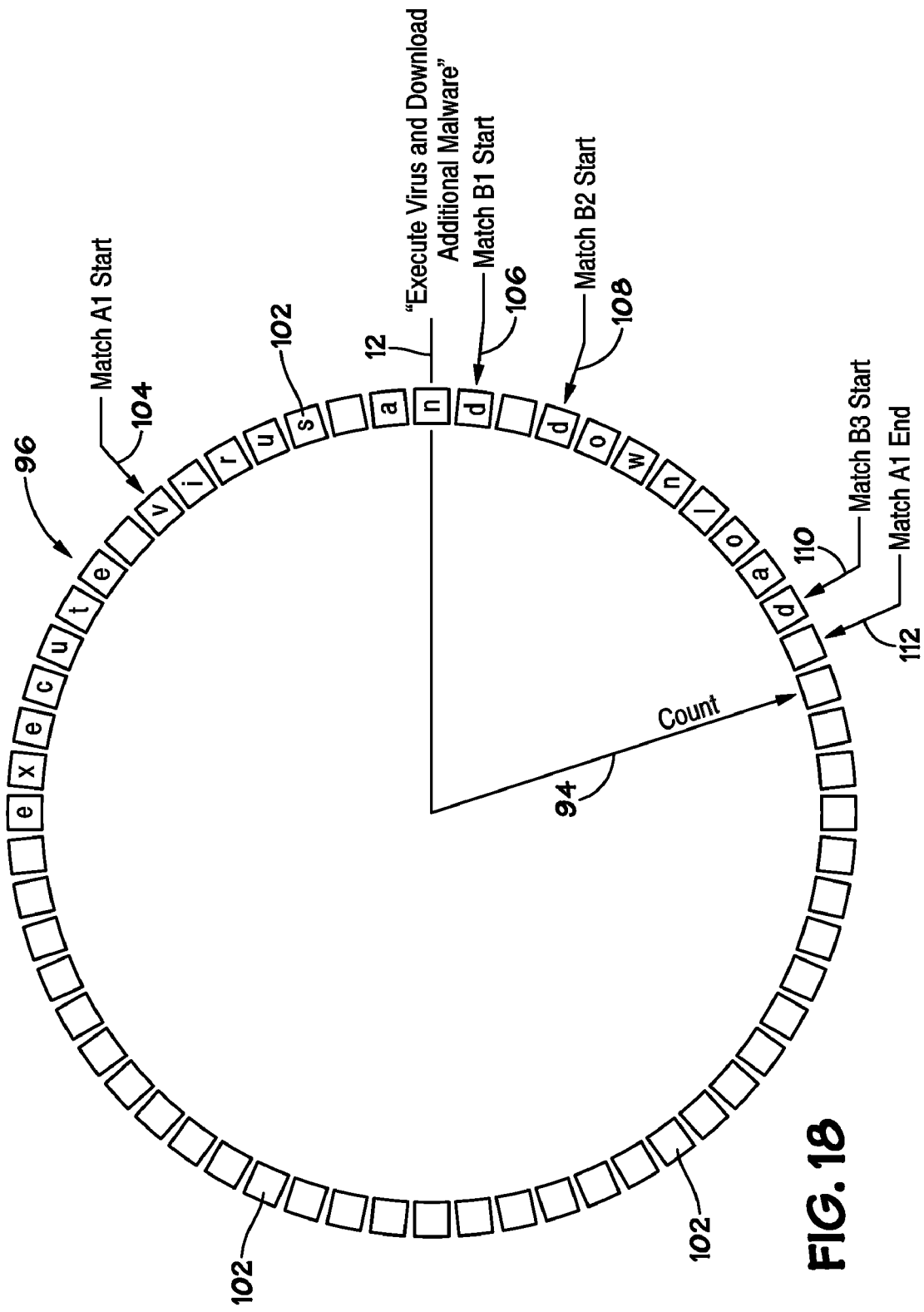

As illustrated by FIG. 18, the circular buffer 96 may continue to store terms from the data stream 12 while the pattern-recognition processor 14 (FIG. 2) searches the data stream 12. The last letter of the word "download" may cause the match event table 98 to record another match event 110. The ending letter "d" satisfies the first search term of criterion B. As a result, the match event table 98 may record the value of the counter 94 when this term is presented. When the space after the letter "d" is presented by the data stream 12, this criterion satisfaction fails, and the match event 110 may be designated in the match event table 98 as indicating the start of a failed criterion satisfaction and being safe to overwrite.

As mentioned above, the criteria may be evaluated in parallel. When the space after the word "download" is received, the last search term in criterion A is matched. In response, the final feature cell 30 (FIG. 2) that specifies criterion A may record the value of the counter 94 in the match event table 98. The final feature cell 30 may output a signal on the detection bus 38 indicating that it is matched, it is active, and it is the last search term of criterion A. The match event table 98 may store a new match event 112 by storing the value of the counter 94 and, in some embodiments, the identity of the criteria.

If more than one criterion satisfaction for criteria A is in progress, the match event table 98 may correlate the match event 112 with the earliest match event in the match event table 98 for criteria A. In other embodiments, the match event table 98 may include data for each match event indicating both which criterion is being matched (e.g., A or B) and which match of the criterion caused the match event (e.g., the first or second match of B), as some criterion may be in multiple stages of being satisfied at the same time. Some matching data sets for a given criterion may be shorter than others for the same criterion, so storing data identifying which criterion satisfaction of a criterion caused a match event may facilitate correlating beginning match events with completed match events. For example, a search criterion may specify two different ways to be satisfied, such as: 1) a word that starts with the letter "m" and ends with "e"; or 2) a word including the sequence of letters "est". A data stream that presents the sequence "milestones" matches both ways to satisfy the criterion. In such an example, the satisfaction that starts second is finished first. Thus, including match identifiers in the match event table 98 may facilitate identifying the matching portion of the data stream 12.

When a criterion is satisfied, the aggregation module 24 (FIG. 2) may report to the CPU 20 through the output bus 26 that a search criterion is satisfied. The aggregation module 24 may also report which search criterion is satisfied upon being further interrogated by the CPU 20, or the aggregation module 24 may identify the criterion without being prompted.

When the CPU 20 receives a signal indicating a criterion satisfaction, the CPU 20 may request the matching data from the matching-data reporting module 25 (FIG. 13). The request may be transmitted to the controller 100 via the output bus 26. In response, the controller 100 may transmit the data in the circular buffer 96 that is between the starting match event pointer and the ending match event pointer. In the example illustrated by FIG. 18, the matching-data reporting module 25 may report the data between the match event pointer 104, indicating the start of the match of criterion A, and the match event pointer 112, indicating the end of the match.

The CPU 20 may use this data to a variety of different ends. For example, the CPU 20 may create a log of matching data or the CPU 20 may report the matching data to a server over a network, e.g., a server operated by an entity that sells subscriptions to search criteria. In some embodiments, the CPU 20 may report the matching data or data based on the matching data to a system administrator or an entity responsible for enforcing copyrighted content that includes the matching data.

Once the matching data is reported to the CPU 20, or once the CPU indicates that it is not requesting the matching data, the entries for the match event pointers 104 and 110 in the match event table 98 may be overwritten or designated as being safe to be overwritten.

Figure 19:
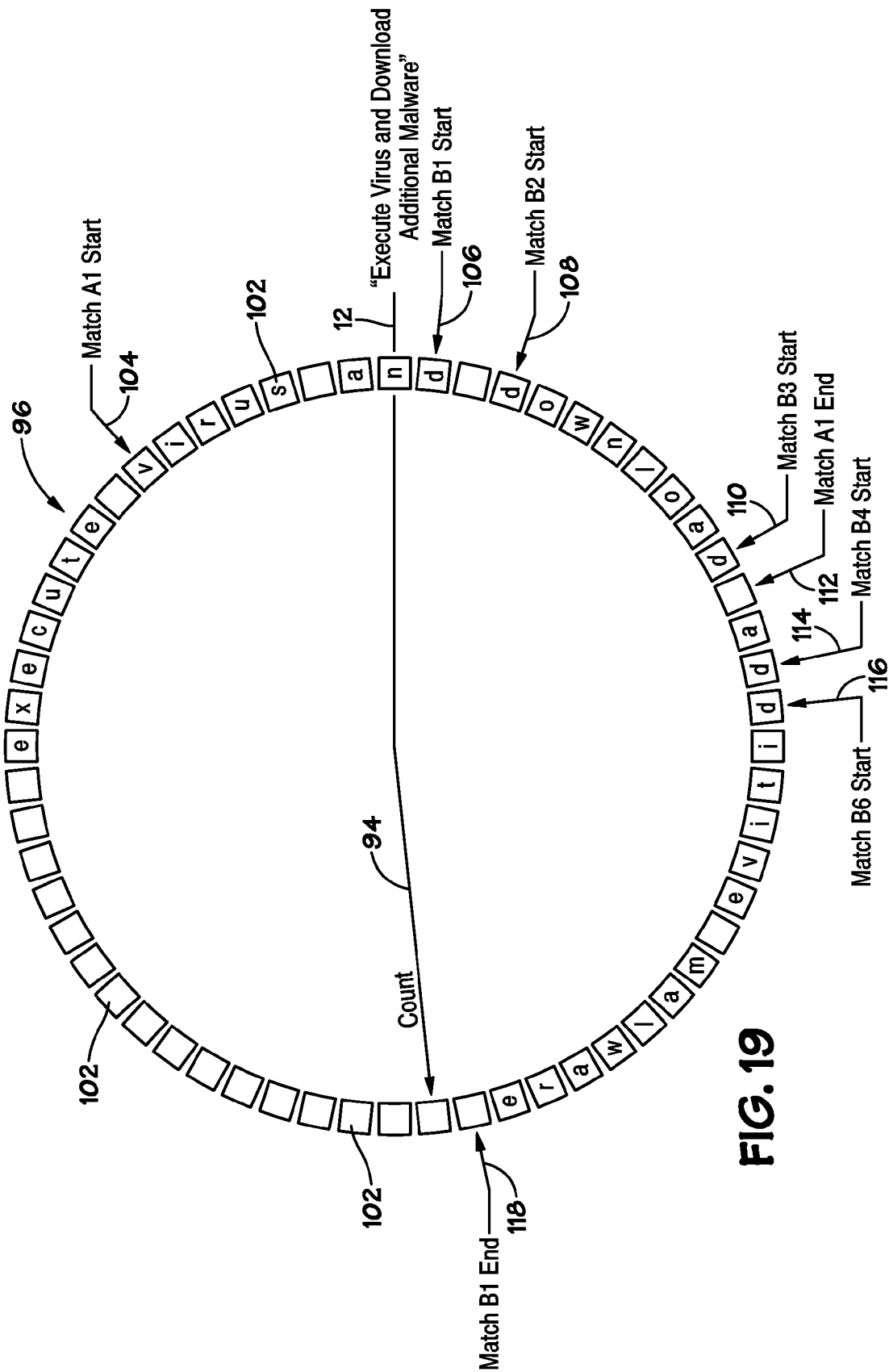

Though criterion A is satisfied, criterion B is still midway through a satisfaction in the state illustrated by FIG. 19. Match event pointer 108 has not been designated as indicating the start of a failed match. Thus, as the circular buffer 96 continues to store terms from the data stream 12, the pattern-recognition processor 14 (FIG. 2) may continue to search for the word "malware" within the four words following "download".

Further, each time the letter "d" is presented by the data stream 12, the match event table 98 may store another match event pointer, as indicated by match event pointers 114 and 116. Each of these match event pointers 114 and 116 may be designated as indicating failed matches when subsequent, non-matching terms are presented by the data stream 12.

After the word "malware" is presented, criterion B may be fully satisfied. In response, the match event table 98 may store the match event pointer 118. The match may be reported to the CPU 20, and the CPU 20 may request the matching data from the matching-data reporting module 25. The controller 100 may transmit the portion of the circular buffer 96 between match event pointer 106 and match event pointer 118. Once this data is reported, the match event pointers 106 and 118 may be designated as being safe to overwrite. In other embodiments, the match event pointers 106 and 108 may persist for some time after the completion of a match. For example, the CPU 20 may have a certain number of search cycles to determine whether to request matching data before the match event pointers 106 and 108 are overwritten or are designated as being safe to overwrite.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device, comprising:
   a pattern-recognition processor comprising:
      a plurality of feature cells each comprising:
         a plurality of memory cells, where each of the memory cells is coupled to an output conductor and to one of a plurality of input conductors; and
         a detection cell comprising an activation memory cell, wherein the detection cell is configured to output a signal based on the state of the activation memory cell and a signal received from the output conductor;
      a decoder configured to receive a data stream and select one of the plurality of input conductors based on data received from the data stream; and
      a matching-data reporting module comprising:
         a buffer coupled to the data stream and configured to store at least part of the data stream; and
         a match event table configured to store data indicative of a buffer location corresponding with a start of a search criterion being satisfied.

2. The device of claim 1, wherein the buffer comprises a circular buffer.

3. The device of claim 1, wherein the matching-data reporting module comprises a counter.

4. The device of claim 3, wherein the counter is configured to increment or decrement a count each time a term or a portion of a term is received from the data stream.

5. The device of claim 3, wherein the matching-data reporting module is configured to store data from the data stream in locations in the circular buffer that are selected based on a value of the counter.

6. The device of claim 5, wherein the matching-data reporting module is configured to write the value of the counter to the match event table in response to a first search term of a search criterion being matched.

7. The device of claim 6, wherein the matching-data reporting module is configured to write the value of the counter to the match event table in response to a last search term of the search criterion being matched.

8. The device of claim 1, wherein the matching-data reporting module is configured to output a portion of a data stream that satisfied a search criterion.

9. The device of claim 1, comprising a central processing unit (CPU) coupled to the pattern-recognition processor, wherein the matching-data reporting module is configured to output the portion of the data stream that satisfied the search criterion to the CPU in response to a request for the portion of the data stream from the CPU.

10. The device of claim 1, wherein the matching-data reporting module comprises a timer.

11. The device of claim 1, wherein the matching-data reporting module comprises a pattern generator that outputs a repeatable sequence of values.

12. The device of claim 1, wherein the match event table comprises groups of memory cells, and wherein each group is associated with a group of feature cells.

13. The device of claim 1, comprising a server, a personal computer, a work station, a router, a network switch, chip test equipment, a laptop, a cell phone, a media player, a game console, or a mainframe computer that comprises the pattern-recognition processor.

14. A method, comprising:
   writing a data stream to a buffer of a matching-data reporting module;
   matching a first search term of a search criterion to a first matching term from the data stream;
   and in response to a match, storing a first value indicative of a first address of the buffer at which the first matching term is stored.

15. The method of claim 14, wherein storing the first value comprises storing the first address of the buffer at which the first matching term is stored.

16. The method of claim 14, comprising:
   matching a last search term of the search criterion to a second matching term from the data stream; and
   in response to matching the last search term, storing a second value indicative of a second address of the buffer at which the second matching term is stored.

17. The method of claim 16, comprising:
   reporting satisfaction of the search criterion to a central processing unit;
   receiving a request for the data that satisfied the search criterion from the CPU; and
   in response to the request, transmitting data stored by the buffer.

18. The method of claim 17, wherein transmitting data stored by the buffer comprises transmitting data stored between the first address and the second address.

19. The method of claim 18, wherein transmitting data stored between the first address and the second address does not include transmitting data stored before the first address other than data stored before the second address.

20. The method of claim 14, wherein writing the data stream to the buffer comprises overwriting data previously written to the buffer.

21. The method of claim 14, comprising selecting one input conductor among a plurality of input conductors based on a term presented by the data stream.

22. The method of claim 14, comprising storing criterion-identifying data that identifies the criterion.

23. The method of claim 14, comprising storing match-identifying data that distinguishes the match from a previous match.

24. A device, comprising:
a matching-data reporting module comprising:
a buffer configured to store data from a data stream;
a buffer-address generator that outputs addresses corresponding to the data stored in the buffer; and
a match event table having memory for storing addresses output from the buffer-address generator that correspond with a start of a search criterion being satisfied.

25. The device of claim 24, wherein the buffer-address generator comprises a counter.

26. The device of claim 24, wherein the buffer comprises a circular buffer.

27. The device of claim 24, comprising:
a recognition module coupled to the data stream; and
an aggregation module coupled to an output of the recognition module.

28. The device of claim 24, comprising a controller configured to write data from the data stream at addresses of the buffer.

29. The device of claim 28, wherein the controller is configured to write a value from the buffer-address generator to the match event table in response to data from the data stream matching a portion of a search criterion.

30. The device of claim 28, wherein the controller is configured to output data from the buffer based on addresses stored in the match event table.

31. The device of claim 30, wherein the controller is configured to output data from the buffer in response to a request from a central processing unit.

32. The device of claim 30, wherein the controller is configured to output data from the buffer that is between a match starting address and a match ending address that are stored by the match event table.

33. A method, comprising:
searching a data stream according to search criteria;
storing a portion of the data stream in a circular buffer of a matching-data reporting module; and
if a matching portion of the data stream satisfies a portion of a search criterion among the search criteria, storing an address of the circular buffer that is indicative of where the matching portion of the data stream is stored.

34. The method of claim 33, wherein searching the data stream according to search criteria comprises searching according to the search criteria at generally the same time.

35. The method of claim 34, wherein the search criteria comprise more than 1000 search criteria.

36. The method of claim 33, wherein storing the portion of the data stream in the circular buffer comprises overwriting previously stored portions of the data stream.

37. The method of claim 33, wherein storing the portion of the data stream in the circular buffer comprises:
incrementing or decrementing a counter; and
writing data from the data stream to addresses of the circular buffer based on a count of the counter.

38. The method of claim 33, comprising outputting data from the circular buffer after satisfying the search criterion.

* * * * *